(12) United States Patent
Xiao et al.

(10) Patent No.: US 8,693,386 B2
(45) Date of Patent: Apr. 8, 2014

(54) RESOURCE ALLOCATION FOR ORTHOGONAL DECODE-AND FORWARD-INPUT MULTIPLE-OUTPUT RELAY CHANNELS WITH FINITE RATE FEEDBACK

(75) Inventors: Jun Xiao, Boulder, CO (US); Wen Gao, West Windsor, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 310 days.

(21) Appl. No.: 13/138,043

(22) PCT Filed: Dec. 9, 2009

(86) PCT No.: PCT/US2009/006470
§ 371 (c)(1),
(2), (4) Date: Jun. 27, 2011

(87) PCT Pub. No.: WO2010/077291
PCT Pub. Date: Jul. 8, 2010

(65) Prior Publication Data
US 2011/0268015 A1    Nov. 3, 2011

Related U.S. Application Data

(60) Provisional application No. 61/142,445, filed on Jan. 5, 2009.

(51) Int. Cl.
H04B 7/14    (2006.01)
(52) U.S. Cl.
USPC ............................. 370/315; 455/7; 375/211
(58) Field of Classification Search
None
See application file for complete search history.

(56) References Cited

U.S. PATENT DOCUMENTS

2006/0121946 A1*    6/2006    Walton et al. ................. 455/561

OTHER PUBLICATIONS

Madsen etal. "Capacity Bounds and Power Allocation for the Wireless Rely Channel", Dept. of Electrical Engineering, University of Hawaii. NSF grant CCR03-29908, Sep. 18, 2003.
Dai etal. "On the Information Rate of MIMO Systems with Finite Rate Channel State Feedback Using Beamforming and Power On/Off Strategy", IEEE ISIT 2005. pp. 1549-1553.
Dai etal. "Quantization Bounds on Grassmann Manifolds and Applications to MIMO Communications" Mar. 2008 IEEE, vol. 54, No. 3, pp. 1108-1123.

(Continued)

*Primary Examiner* — Jianye Wu
(74) *Attorney, Agent, or Firm* — Robert D. Shedd; Reitseng Lin (57) ABSTRACT

A near-optimal resource allocation method is provided for a Multiple-Input Multiple-Output (MIMO) relay scheme in which the source and relay nodes have only partial channel state information (CSI), obtained through finite rate feedback, and the powers of the source and relay nodes are constrained. Power on/off beamforming is employed at the source and relay nodes in which the receiving node feeds back the index of a beamforming matrix selected in accordance with the channel state. Using channel statistical information, the exemplary method allocates time between the first stage and the second stage of the relay transmission, and power between the source and the relay node. With only limited CSI feedback, the resource allocation method enjoys a considerable performance advantage over arrangements with no feedback.

16 Claims, 3 Drawing Sheets

(56) References Cited

OTHER PUBLICATIONS

Liang et al "Resource Allocation for Wireless Fading Relay Channels: Max-Min Solution", vol. 53, No. 10, Oct. 2007, pp. 3432-3453.
Wang et al "On the Capacity of MIMO Relay Channels", vol. 51, No. 1 Jan. 2005, pp. 29-43.
Dai et al. On the Information Rate of MIMO Systems with Finite Rate Channel State Feedback Using Beamforming and Power On/Off Strategy, vol. 55, No. 11, Nov. 2009, pp. 5032-5047.
Xiao et al "Resource Allocation for MIMO Orthogonal Relay Channels with Finite-Rate Feedback", IEEE 2009, pp. 512-517.
Search Report Dated Mar. 10, 2010.

* cited by examiner

RESOURCE ALLOCATION FOR ORTHOGONAL DECODE-AND FORWARD-INPUT MULTIPLE-OUTPUT RELAY CHANNELS WITH FINITE RATE FEEDBACK

RELATED PATENT APPLICATIONS

This application claims the benefit, under 35 U.S.C. §365 of International Application PCT/US2009/006470, filed Dec. 9, 2009, which was published in accordance with PCT Article 21(2) on Jul. 8, 2010 in English and which claims the benefit of U.S. provisional patent application No. 61/142,445, filed Jan. 5, 2009.

FIELD OF INVENTION

The present invention generally relates to communications systems and, more particularly, to wireless systems, e.g., terrestrial broadcast, cellular, Wireless-Fidelity (Wi-Fi), satellite, etc.

BACKGROUND

In a Multiple-Input Multiple-Output (MIMO) relay channel, channel state information (CSI) at the source and the relay can improve the overall network throughput.

Power on/off beamforming with finite rate feedback has been proposed in W. Dai et al., "On the information rate of MIMO systems with finite rate channel state feedback using beamforming and power on/off strategy," *IEEE Trans. Info. Theory*, vol. 55, no. 11, pp. 5032-5047, 2009, which considers point-to-point MIMO channels. For such a scheme, power allocation is not a problem because the transmitter uses constant power.

There have also been several studies which have considered resource allocation and achievable rate in MIMO relay arrangements (see, e.g., A. Host-Madsen et al., "Capacity bounds and power allocation for wireless relay channels," *IEEE Trans. Info. Theory*, vol. 51, no. 6, pp. 2020-2040, 2005; Y. Liang et al., "Gaussian orthogonal relay channels: Optimal resource allocation and capacity," *IEEE Trans. Info. Theory*, vol. 51, no. 9, pp. 3284-3289, 2005; L. Yingbin et al., "Resource allocation for wireless fading relay channels: Max-min solution," *IEEE Trans. Info. Theory*, vol. 53, no. 10, pp. 3432-3453, 2007; and B. Wang et al., "On the capacity of MIMO relay channels," *IEEE Trans. Info. Theory*, vol. 51, no. 1, pp. 29-43, 2005). All of these studies, however, assume perfect CSI at the source and/or at the relay. Unfortunately, the impractical assumption of perfect CSI makes the implementation of these approaches questionable in real communication systems.

SUMMARY

In an exemplary embodiment, a near-optimal resource allocation method is provided for a Multiple-Input Multiple-Output (MIMO) relay scheme in which the source and relay nodes have only partial channel state information (CSI), obtained through finite rate feedback, and the power of the source and relay nodes is constrained. Power on/off beamforming is employed at the source and relay nodes in which the receiving node feeds back the identity of a beamforming matrix selected in accordance with the channel state. Using channel statistical information, the exemplary method allocates time between the first and second stages of the relay transmission, and power between the source and the relay nodes. With only finite rate CSI feedback, the exemplary resource allocation method enjoys a considerable performance advantage over arrangements with no feedback. In an exemplary embodiment, resource allocation is carried out by a scheduler at the source node operating in accordance with the method.

In view of the above, and as will be apparent from the detailed description, other embodiments and features are also possible and fall within the principles of the invention.

BRIEF DESCRIPTION OF THE FIGURES

Some embodiments of apparatus and/or methods in accordance with embodiments of the present invention are now described, by way of example only, and with reference to the accompanying figures in which.

DESCRIPTION OF EMBODIMENTS

Other than the inventive concept, the elements shown in the figures are well known and will not be described in detail. For example, other than the inventive concept, familiarity with wireless communications including Multiple-Input Multiple-Output (MIMO), relay, decode-and-forward, channel state information (CSI) feedback, and beamforming methods and apparatus is assumed and not described herein. It should also be noted that aspects of the inventive concept may be implemented using conventional programming techniques, which, as such, will not be described herein. Finally, like-numbers on the figures represent similar elements.

System Model

Figure 1A:
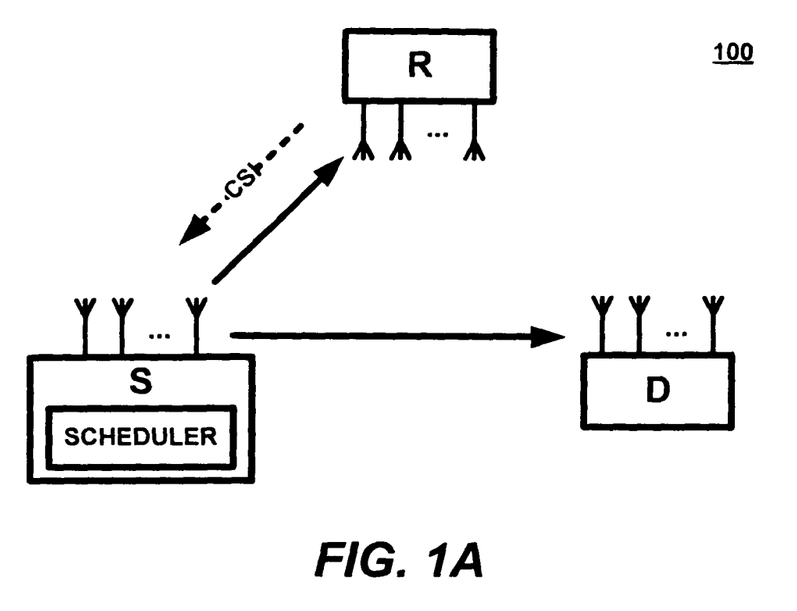
FIGS. 1A and 1B show schematic representations of the first and second stages, respectively, of a half-duplex orthogonal decode-and-forward MIMO relay arrangement.
Figure 1B:
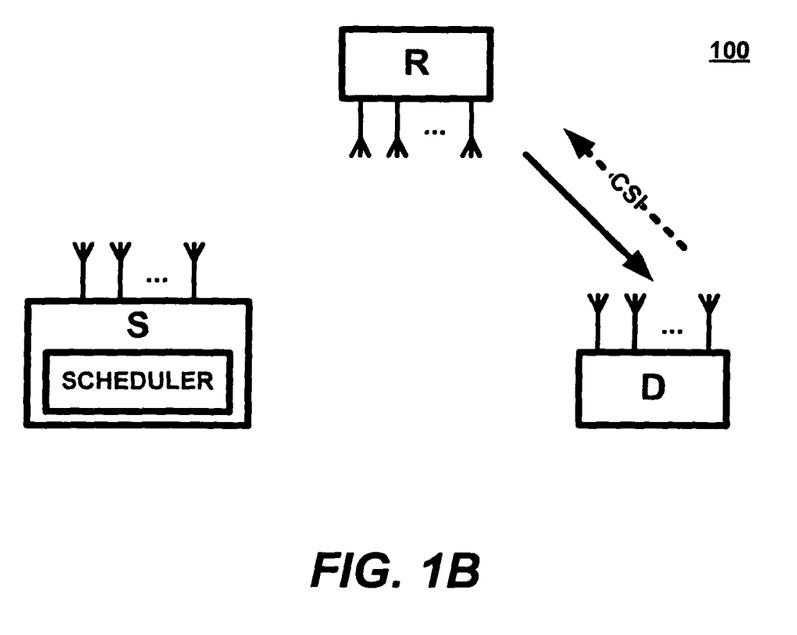

FIGS. 1A and 1B show a schematic representation of an exemplary Multiple-Input Multiple-Output (MIMO) relay wireless communication arrangement 100 comprising source node S, relay node R and destination node D. Typically, destination node D may be a mobile station, with source node S and relay node R being stationary, although any combination of stationary and mobile nodes is contemplated. Illustratively, half-duplex, orthogonal, decode-and-forward MIMO relay channels are used with finite-rate channel state information (CSI) feedback. Being half-duplex, the relay node does not receive and transmit signals simultaneously. As such, each downstream transmission frame is split into two stages: a first stage, depicted in FIG. 1A, in which relay node R receives and a second stage, depicted in FIG. 1B, in which relay node R transmits. Being orthogonal, source node S transmits in the first stage but does not transmit in the second stage. Destination node D receives throughout the downstream frame, from source node S in the first stage and from relay node R in the second stage.

Source node S has multiple transmit antennas, relay node R has multiple antennas which are used to receive and transmit and destination node D has multiple receive antennas. Each antenna may be used to transmit or receive or to transmit and receive.

In the exemplary arrangement shown, source node S also includes a scheduler for allocating resources in the relay communications arrangement 100. In accordance with an exemplary resource allocation method, described in greater detail below, the scheduler allocates time between the first stage and the second stage, and power between the source and the relay nodes based on channel statistical information (e.g., path loss factors or coefficients, distributions of the channel matrices between the source and relay nodes, between the relay and destination nodes, and between the source and destination nodes) and finite rate CSI feedback.

In the first stage, as shown in FIG. 1A, only source node S transmits and the corresponding signals received at relay node R and destination node D can be represented as follows:

$$Y_r = \sqrt{\gamma_{sr}} H_{sr} X_s + W_1 \tag{1}$$

$$Y_{d,1} = \sqrt{\gamma_{sd}} H_{sd} X_s + W_2 \tag{2}$$

where $Y_r$ and $Y_{d,1}$ are the received signals at relay node R and at destination node D respectively; $\gamma_{sr}$ and $\gamma_{sd}$ are the path loss coefficients for the source-relay and source-destination links, respectively; $H_{sr}$ and $H_{sd}$ are the channel matrices for the source-relay and source-destination links, respectively; $X_s$ is the signal transmitted from source node S; and $W_1$ and $W_2$ are additive white Gaussian noise vectors with zero mean and identity matrix (I) covariance. The dotted arrow represents a limited bandwidth channel from relay node R to source node S for CSI feedback.

FIG. 1B shows that in the second stage, only relay node R transmits. The received signal at destination node D in the second stage is:

$$Y_{d,2} = \sqrt{\gamma_{rd}} H_{rd} X_r + W_3 \tag{3}$$

where $X_r$ is the signal transmitted from relay node R; $\gamma_{rd}$ is the path loss coefficient between the relay and destination nodes; $H_{rd}$ is the channel matrix between the relay and destination nodes; and $W_3$ is an additive white Gaussian noise vector with zero mean and identity matrix covariance. The dotted arrow represents a limited bandwidth CSI feedback channel from destination node D to relay node R.

In the exemplary system 100 of FIGS. 1A and 1B, a Rayleigh block independent identically distributed (i.i.d.) fading channel model is assumed; i.e., the channel matrices H are independent from block to block but constant within a block. In a typical illustrative application, the duration of a block is on the order of microseconds.

In the exemplary system 100 of FIGS. 1A and 1B, a power on/off beamforming strategy is employed for the CSI feedback. In such a strategy, the transmitting node will apply power to selected ones of its multiple transmit antennas to generate "on" beams in accordance with a beamforming matrix selected from a codebook. The codebook may be designed, for example, using quantization on Grassmann manifolds in accordance with known techniques. The beamforming matrix is selected in accordance with CSI fed-back from the receiving node. The CSI fed-back from the receiving node may include an explicit identification of which beamforming matrix to use (e.g., a matrix index or identifier) or information indicative of the channel state from which the transmitting node can determine the optimal beamforming matrix to use for the given channel conditions. In an exemplary embodiment, the beamforming matrix is determined in accordance with the CSI feedback from the receiving node. As described above, CSI is fed back from relay node R to source node S in the first stage (FIG. 1A) and from destination node D to relay node R in the second stage (FIG. 1B).

The proportion of time of a transmission frame for the duration of the first stage is denoted herein as $\alpha$, and for the second stage $1-\alpha$, with $0<\alpha<1$. In an exemplary system, there is a total power constraint between source node S and relay node R, so that:

$$\alpha P_s + (1-\alpha) P_r \leq \rho, \tag{4}$$

where $\rho$ is the total transmission power of source node S and relay node R and $P_s$ and $P_r$ are the transmission powers at source node S and relay node R, respectively. The achievable transmission rate (e.g., bits/sec) from source to destination using decode-and-forward with the total power constraint (4) can be expressed as follows:

$$R = \max_{\alpha, P_s, P_r, s_1, s_2} \min\{I_1, I_2\} \tag{5}$$

$$I_1 \approx E_H\left[\alpha \log\det\left(I + \frac{P_s}{s_1} \gamma_{sr} \mu_{sr} \Lambda_{sr,s_1}\right)\right]$$

$$I_2 \approx E_H\left[\alpha \log\det\left(I + \frac{P_s}{s_1} \gamma_{sd} \Lambda_{sd,s_3}\right) + (1-\alpha)\log\det\left(I + \frac{P_r}{s_2} \gamma_{rd} \mu_{rd} \Lambda_{rd,s_2}\right)\right],$$

where $E_H$ is the expected value with respect to channel matrix H; $s_1$ and $s_2$ are the number of "on" beams in the first and second stages, respectively, or equivalently, the number of "on" beams used at the source node S and relay node R, respectively; $s_3$ equals the minimum of $s_1$ and the number of receiving antennas at destination node D; $\mu_{sr}$ and $\mu_{rd}$ are power efficiency factors ($\leq 1$) which are functions of the finite feedback rates from relay to source and destination to relay, respectively, and serve to reduce the respective transmitting node powers $P_s$ and $P_r$ accordingly; and each $\Lambda_{ij,n}$ is a diagonal matrix with its entries being the n largest eigenvalues of $H_{ij}^\dagger H_{ij}$.

This resource allocation problem, however, is non-convex which makes the optimal solution hard to obtain. An exemplary allocation method based on a near-optimal solution with near-optimal performance is provided and described below.

Near-Optimal Resource Allocation

The achievable rate as set forth in Eq. 5 above can be rewritten as follows:

$$R = \max_{\alpha, \beta, s_1, s_2} \min\{I_1, I_2\} \tag{6}$$

$$I_1 \approx E_H\left[\alpha \log\det\left(I + \frac{\beta \rho}{\alpha s_1} \gamma_{sr} \mu_{sr} \Lambda_{sr,s_1}\right)\right]$$

$$I_2 \approx E_H\left[\begin{array}{l}\alpha \log\det\left(I + \frac{\beta \rho}{\alpha s_1} \gamma_{sd} \Lambda_{sd,s_3}\right) + \\ (1-\alpha)\log\det\left(I + \frac{(1-\beta)\rho}{(1-\alpha)s_1} \gamma_{rd} \mu_{rd} \Lambda_{rd,s_2}\right)\end{array}\right]$$

where $\beta$ and $1-\beta$ indicate the ratios of the total power $\rho$ allocated to the first and second stages, respectively, with $0<\beta<1$. Thus in the allocation of resources between the two stages, $\alpha$ represents time allocation and $\beta$ represents power allocation. In Eq. 6, $P_s$ has been replaced with $$\frac{\beta\rho}{\alpha}$$

and $P_r$ with $$\frac{(1-\beta)\rho}{1-\alpha}.$$

Figure 2:
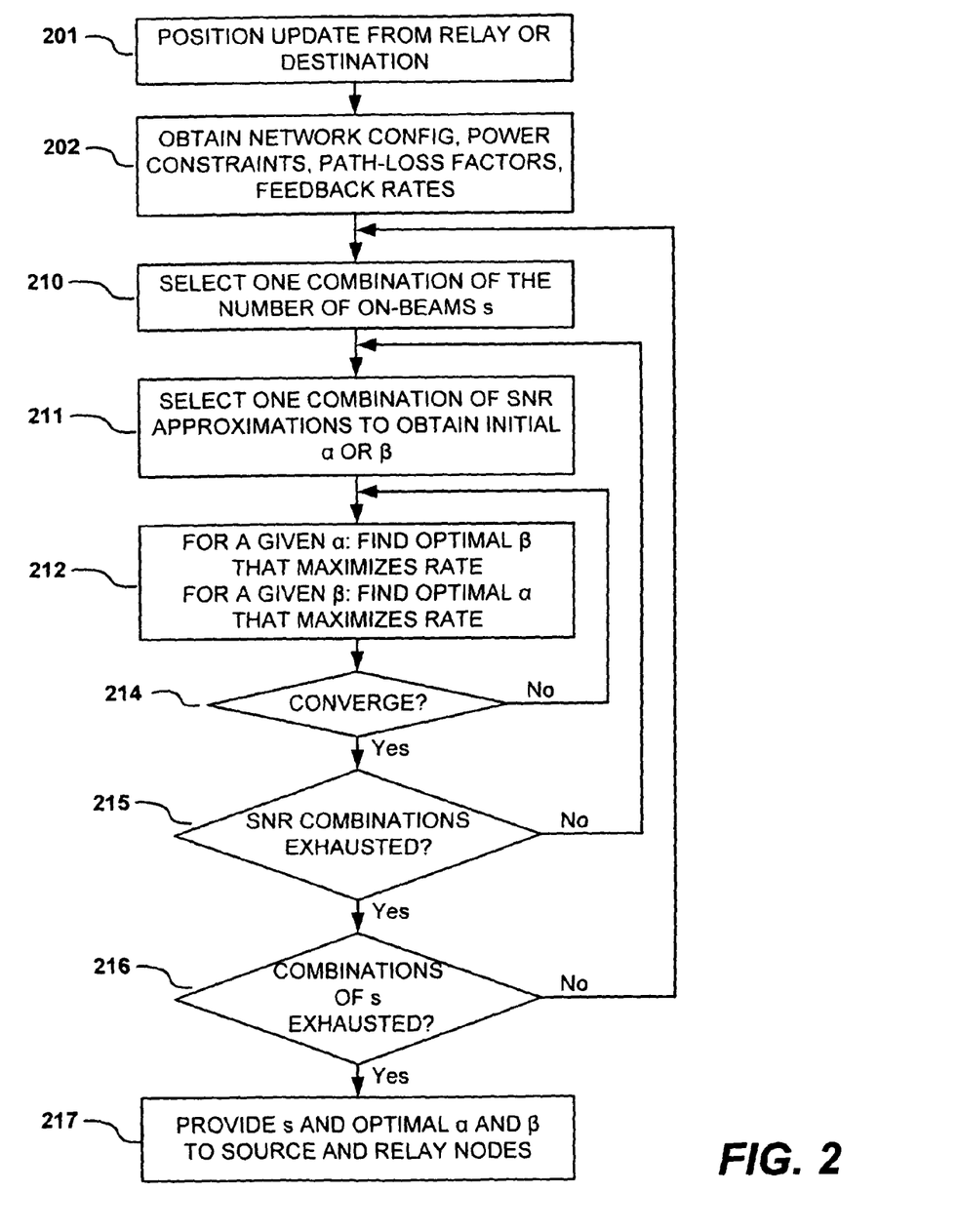
FIG. 2 is a flowchart of an exemplary method of allocating resources for a half-duplex orthogonal decode-and-forward MIMO relay arrangement in which the source and relay nodes are subject to a total power constraint.

FIG. 2 is a flowchart of an exemplary method of allocating resources for a half-duplex orthogonal decode-and-forward MIMO relay arrangement in which the source and relay nodes are subject to a total power constraint. The method is based on a near-optimal solution for the parameters s, α and β of Eq. 6. This method may be carried out by a scheduler, for example, located at source node S, as shown in FIGS. 1A and 1B.

At step 201, the resource allocation method is initiated, for example, when channel conditions change, such as a result of a change in position of destination node D. Such an event will usually be reflected in a change in the path loss coefficients of the channels and can be detected at the receiving node (e.g., the destination node). In an exemplary embodiment, the relay and/or destination nodes can periodically estimate the path loss coefficients and feed them back to the scheduler. The scheduler can then determine whether a new resource allocation is required and if so, perform the exemplary resource allocation method.

Once the exemplary resource allocation method has been initiated, operation proceeds to step 202 in which various parameters to be used in carrying out the resource allocation method are obtained (e.g., read from storage, received, measured), including, for example, the network configuration, constraints on the source and relay power for the links in question (e.g., total power), channel statistical information (e.g. path loss factors, channel matrix probability distributions) for the three links between nodes S, R and D, and the feedback channel rates from node R to node S and node D to node R.

Note that the scheduler need only know the statistics or the probability distribution of each channel matrix H, as opposed to H itself (or an estimate of H), in order to determine the resource allocation (values for s, α, and β). In an exemplary embodiment, the statistics for the channel between a transmitting node and a receiving node can be obtained using a special training phase in which the transmitting node sends to the receiving node a known training signal from which the receiving node can estimate the channel using known techniques. The receiving node feeds back the estimate of the channel to the scheduler which extracts the statistics of the channel for carrying out resource allocation.

At step 210, out of a plurality of possible combinations of the number of "on" beams s one such combination is chosen. Note that since $s_3$ equals the minimum of $s_1$ and the number of receiving antennas at destination node D, the possible combinations of the values of s is actually determined by $s_1$ and $s_2$, the numbers of on-beams used in the first and second stages, respectively. In step 210, because combination optimization is extremely hard and $I_1$ and $I_2$ are not necessarily differentiable functions about s, an exhaustive search of all possible combinations of values for s is carried out in the exemplary method. Note, however, that the burden of such a search should be manageable because each value of s is at most equal to the number of receive antennas, typically a small number. Moreover, the allocation of resources will typically only need to be updated when the position of a mobile destination node changes. Furthermore, the number s for a transmitting node is a monotonically increasing function of power. Therefore, in some scenarios it is not necessary to exhaustively search over a number of different values. For example, in the case of a link with low signal-to-noise ratio (SNR), the value of the corresponding parameter s (i.e., $s_1$ for the S-R link, $s_2$ for the R-D link, and $s_3$ for the S-D link) is 1, and in the case of a link with high SNR, the corresponding s is equal to the number of receive antennas. A reason that lower number of "on" beams is used when the SNR is low is that each "on" beam would be stronger with a given power allocated to a node. The SNRs can be obtained in a training session and the training should be performed from time to time just in case that the SNRs change significantly.

Operation then proceeds to step 211, at which initial values for α and/or β are determined based on approximations of SNR for the three links between the source, relay and destination nodes (i.e., S-R, R-D and S-D). In accordance with an exemplary procedure, described in greater detail below, the SNR of each link is approximated as being "high" or "low," with initial values for α and/or β being determined based on the combination of SNR approximations. As discussed below, all (seven) meaningful combinations of SNR approximations (see Table 1) for the three links are considered in the exemplary method of FIG. 2, with some combinations providing an initial value for α and some combinations providing an initial value for β.

Operation then proceeds to step 212, at which the optimal value for β that maximizes the achievable rate R is determined for a given value of α and the optimal value for α that maximizes the achievable rate R is determined for a given value of β. For a given value of α, $I_1$ is a monotonically increasing function about β, and $I_2$ is a concave function about β. The maximum rate is achieved at either the maximum point of $I_2$ or the cross point of $I_1$ and $I_2$. The maximum point, $\beta_m = \arg\max(I_2)$, can be obtained from the root of $$\frac{\partial I_2(\beta)}{\partial \beta} = 0,$$

which can be found, for example, using a bisection procedure, where:

$$\frac{\partial I_2(\beta)}{\partial \beta} = \frac{\alpha s_3}{r_2 \beta}\left(\frac{1-A_2^2}{B_2} + A_2\right) + \frac{(1-\alpha)m_{sd}}{\pi r_3 \beta \rho} \quad (7a)$$

$$\left(\frac{2}{B_3}\left(\frac{\pi(1-A_3^2)}{2} - \theta(k_3) + \frac{\theta(k_3)}{B_3}\right) + A_3(\pi - k_3) - \sin(k_3)\right),$$

$$A_2 = \frac{\alpha s_1 r_2}{2\rho \gamma_{sd} \beta m_{sr}} + \frac{1}{2r_2} + \frac{r_2}{2},$$

$$B_2 = \sqrt{(A_2+1)(A_2-1)},$$

$$A_3 = \frac{(1-\alpha)s_2 r_3^2/s_3 + \rho(1-\beta)\gamma_{rd}\mu_{rd}(1+r_3^2)}{2r_3\rho(1-\beta)\gamma_{rd}\mu_{rd}},$$

$$B_3 = \sqrt{(A_2+1)(A_2-1)},$$

$$\theta(k_3) = \arctan((A_3+1)\tan(k_3/2)/B_3),$$

$k_3$ is the solution of $$s_2 = \int_{k_3}^{\pi} \frac{s_3}{\pi} \frac{1 - \cos(2t)}{1 + r_2^2 - 2r_2\cos(t)} dt, \quad (7b)$$

$m_{ij}=\min(L_{T_i},L_{R_j})$, $n_{ij}=\max(L_{T_i},L_{R_j})$, $L_{T_i}$ and $L_{R_i}$ are the number of transmitting and receiving antennas, respectively, of node i; $r_2=\sqrt{\max(s_3,L_{R_d})/s_3}$; and $r_3=\sqrt{n_{rd}/m_{rd}}$. If $I_1(\beta_m) > I_2(\beta_m)$, the optimal value for $\beta$, $\beta^*$ is $\beta_m$, otherwise, the optimal value $\beta^*$ is the cross point $\beta_c$; i.e., the root of $I_1=I_2$.

Further at step 212, once the optimal value for $\beta$ that maximizes the achievable rate R is determined for the given value of $\alpha$, the optimal value for $\alpha$ that maximizes the achievable rate R is determined using the optimal value for $\beta$ just obtained. The properties of $I_1$ and $I_2$ described above for the determination of the optimal value of $\beta$ apply for the determination of the optimal value of $\alpha$. The maximum rate is achieved at either the maximum point of $I_2$ or the cross point of $I_1$ and $I_2$. The maximum point, $\alpha_m$=arg max($I_2$), can be obtained from the root of $$\frac{\partial I_2(\alpha)}{\partial \alpha} = 0,$$

using, for example, a bisection procedure, where:

$$\frac{\partial I_2}{\partial \alpha} = (\ln(v_1) - \ln(q_1))s_1/m_{sr} - \frac{u_1}{r_2} - \frac{1 - r_2^2}{r_2^2}(\ln(1 - u_1 r_2)) - \quad (8a)$$

$$(\ln(v_2) - \ln(q_2))s_2/s_3 + J_0 + J_1 + J_2 + + \frac{s_3(1 - A_2^2 + A_2 B_2)}{r_2 B_2} +$$

$$\frac{m_{rd}}{\pi r_3}\left(\frac{2}{B_3}\left(\frac{\pi(1 - A_3^2)}{2} - \theta(k_3) + \frac{\theta(k_3)}{B_3}\right) + A_3(\pi - k_3) - \sin(k_3)\right),$$

$$A_2 = -\left(\frac{\alpha r_2 s_1}{2\beta\rho\gamma_{sd}m_{sr}} + \frac{1}{2r_2} + \frac{r_2}{2}\right),$$

$$B_2 = \sqrt{(A_2 + 1)(A_2 - 1)},$$

$$A_3 = \frac{(1 - \alpha)r_3 s_2}{2(1 - \beta)\rho\mu_{rd}\gamma_{rd}s_3} + \frac{1}{2r_3} + \frac{r_3}{2},$$

$$B_3 = \sqrt{(A_3 + 1)(A_3 - 1)},$$

$$\theta(k_3) = \arctan((A_3 + 1)\tan(k_3/2)/B_3),$$

$k_3$ is the solution of $$s_2 = \int_{k_3}^{\pi} \frac{s_3}{\pi} \frac{1 - \cos(2t)}{1 + r_3^2 - 2r_3\cos(t)} dt, \quad (8b)$$

$$u_1 = \frac{1}{2r_2}\left(1 + y_2 + q_1 - \sqrt{(1 + y_1 + q_1)^2 - 4y_1}\right),$$

$$q_1 = \frac{y_1 \alpha s_1}{\beta\rho\gamma_{sd}m_{sr}}, \quad q_2 = \frac{y_3(1 - \alpha)s_2}{(1 - \beta)\rho\mu_{sd}\gamma_{rd}m_{rd}},$$

$$v_1 = \frac{1}{2}\left(1 + y_1 + q_1 + \sqrt{(1 + y_1 + q_1)^2 - 4y_1}\right),$$

$$v_2 = \frac{1}{2}\left(1 + y_3 + q_2 + \sqrt{(1 + y_3 + q_2)^2 - 4y_3}\right),$$

$$u_2 = \frac{1}{2r_3}\left(1 + y_3 + q_2 - \sqrt{(1 + y_3 + q_2)^2 - 4y_3}\right),$$

$$J_0 = \frac{1}{\pi r_3}\left\{\begin{array}{l}\sin(q_2)[1 - \ln(1 + u_2^2 - 2u_2\cos(q_2))] - \\ u_2(\pi - q_2) - (1/u_2 - u_2)\theta_{u_2}\end{array}\right\},$$

$$J_1 = \frac{1 + r_3^2}{2\pi r_3^2}i[\text{Li}_2(u_2 e^{-iq_2}) - \text{Li}_2(u_2 e^{iq_2})],$$

$$J_2 = \frac{1 - r_3^2}{2\pi r_3^2}\left[\begin{array}{l}-2\ln(1 - u_2 r_3)(\pi - q_2 - \theta_{r_3}) + \\ i\text{Sr}_1(u_2, r_3, q_2) - i\text{Sr}_1(u_2, r_3, -q_2)\end{array}\right],$$

$$\theta_{r_3} = \tan^{-1}\left(\frac{r_3\sin(k_3)}{1 - r_3\cos(k_3)}\right),$$

$$\theta_{u_2} = \tan^{-1}\left(\frac{u_2\sin(k_3)}{1 - u_2\cos(k_3)}\right),$$

$$\text{Li}_2(x) = \sum_{n=1}^{\infty} \frac{x^n}{n^2},$$

$$\text{Sr}_1(u, r, t) = \sum_{l=1}^{\infty} \frac{r^l e^{ilt}}{l}\left(\sum_{k=1}^{l-1} \frac{(u/r)^k}{k} + \frac{1}{r^{2l}}\sum_{k=l}^{\infty} \frac{r^{2k}(u/r)^k}{k}\right),$$

and $m_{ij}=\min(L_{T_i},L_{R_j})$, $n_{ij}=\max(L_{T_i},L_{R_j})$, $r_2=\sqrt{\max(s_3,L_{R_d})/s_3}$, $r_3=\sqrt{n_{rd}/m_{rd}}$, and $y_i=r_i^2$. If $I_1(\alpha_m) > I_2(\alpha_m)$, the optimal value for $\alpha$, $\alpha^*$, is $\alpha_m$, otherwise, the optimal value $\alpha^*$ is the cross point $\alpha_c$; i.e., the root of $I_1=I_2$.

Note that the determination of optimal values for $\alpha$ and $\beta$ is described above starting with an initial value for $\alpha$ (from step 211). As can be appreciated, for those combinations of link SNR approximations selected in step 211 which provide an initial value for $\beta$ instead, procedures for determining $\alpha$ from $\beta$ and $\beta$ from $\alpha$ similar to those described above are followed, simply with the orders reversed.

Operation then proceeds to step 214 at which a determination is made as to whether there is convergence to a local optimal point given the values determined in step 212. If not, step 212 is repeated until convergence is achieved. Convergence can be considered to have occurred, for example, if the improvement in achievable rate R after an iteration of step 212 is less than a given threshold value.

Once convergence is achieved, operation proceeds to step 215 in which a determination is made as to whether all of the combinations of SNR approximations (see Table 1) for the three links S-R, R-D and S-D have been exhausted. If not, operation loops back to step 211 in which a new combination of SNR approximations is selected to obtain a new initial value for $\alpha$ or $\beta$. Steps 212 and 214 are repeated as described above using the new initial value for $\alpha$ or $\beta$. Once it is determined at step 215 that all combinations of SNR approximations have been exhausted, operation proceeds to step 216, at which a determination is made as to whether all the combinations of values for s have been exhausted. If not, operation loops back to step 210 to choose another combination of values for s and steps 211, 212, 214 and 215 are repeated, as described above. If it is determined at step 216 that all combinations of values for s have been exhausted, operation proceeds to step 217 in which the optimal set of values for s, $\alpha$ and $\beta$, i.e., the set of values generated by the above-described iterative process that provides the highest achievable rate R, are provided by the scheduler to the nodes for implementation. More specifically, in the exemplary relay arrangement described above, the parameters s, $\alpha$, and $\beta$ are provided to the transmitting nodes (source S and relay R). $s_1$ is provided to the relay node and $s_2$ is provided to the destination node. Also, $\alpha$ is provided to both the relay and the destination nodes in order to synchronize their transmission and reception. It should be noted that if SNR approximation from a training session is used in step 211, step 215 can be eliminated. Furthermore, the process as shown in FIG. 2 can be repeated in response to a change in SNRs obtained from a new training session.

Using the values of s provided by the scheduler, the receiving nodes (relay R and destination D) select the beamforming matrix to be used by the respective transmitting node (source S or relay R) in the following transmission and then feedback the identity of the matrix to the transmitting node. As such, before the transmission from S to R and D, the beamforming matrix to be used by S is obtained at R and is fed-back to S for transmission. Similarly, before the transmission from R to D, the beamforming matrix to be used by R is obtained at D and is fed-back to R for transmission.

Initial Point Determination

As discussed above, the resource allocation problem for the exemplary half-duplex orthogonal decode-and-forward MIMO relay arrangement described above is generally non-convex and the exemplary method will converge to a local optimal point after a few iterations (e.g., five). To ensure a near-optimal solution, many randomly selected initial points may be used or, preferably, just a few or even one good initial point.

To find a good initial point ($\alpha$ and/or $\beta$), as described above in connection with step 211, the SNR of each of the S-D, R-D and S-R links can be approximated as being either "high" (e.g., $\ln(1+SNR)\approx\ln(SNR)$) or "low" (e.g., $\ln(1+SNR)\approx SNR$) in order to separate the influence in Eq. 6 of the channel parameters from $\alpha$ and $\beta$. Because $\alpha$ and $\beta$ are unknown, however, it is not possible to know in advance whether a link is a high or a low SNR link (see Eq. 6). Therefore, as described above, all meaningful combinations of high and low SNR approximations for the three links are considered in order to find the combination which yields the best resource allocation.

In a procedure for determining an initial $\alpha$ or $\beta$, for each link between node i and node j, a parameter $M_{ij}$ is determined as follows for the high SNR approximation:

$$M_{ij}=s_{ij}\log(\rho\gamma_{ij}\mu_{ij}/s_{ij})+E_H[\log det(\Lambda_{ij})], \quad (9)$$

and for the low SNR approximation:

$$M_{ij} = \frac{\rho}{s_{ij}}\gamma_{ij}\mu_{ij}E_H\left[\sum_{i=1}^{s_{ij}}\lambda_i\right]. \quad (10)$$

Using the parameters $M_{ij}$, initial values for $\alpha$ or $\beta$ can then be determined for various combinations of high and low SNR approximations for the three links. Initial values for $\alpha$ and/or $\beta$ for seven different cases (1-7) of link SNR can be determined as set forth below in TABLE 1.

TABLE 1

| Case | SNR Approximation | | | $\alpha, \beta$ |
|---|---|---|---|---|
| | S-R | R-D | S-D | |
| 1 | High | High | High | $\alpha_{initial} = \dfrac{M_{RD}}{M_{RD} + M_{SR} - M_{SD}}$ |
| 2 | Low | Low | Low | $\beta_{initial} = \dfrac{M_{RD}}{M_{RD} + M_{SR} - M_{SD}}$ |

TABLE 1-continued

| Case | SNR Approximation | | | $\alpha, \beta$ |
|---|---|---|---|---|
| | S-R | R-D | S-D | |
| 3 | High | Low | Low | $\alpha_{initial} = \dfrac{M_{RD}}{s_{SR} - \exp(1 - M_{SR}/s_{SR})(M_{SD} - M_{RD})}$ |
| 4 | Low | High | Low | $\beta_{initial} = \min\left(\dfrac{s_{RD}}{M_{SR} - M_{SD}}, 1\right)$ |
| 5 | High | High | Low | $\alpha_{initial} = \dfrac{M_{RD}}{M_{RD} + M_{SR}}$ |
| 6 | High | Low | High | $\alpha_{initial} = \dfrac{M_{RD}}{M_{RD} + M_{SR} - M_{SD}}$ |
| 7 | Low | x | High | $\alpha = 1, \beta = 1$ |

Note that in Case 7, in which the S-D link has high SNR, but the S-R link has low SNR, whether the R-D link has high or low SNR is irrelevant. For this case, relaying would not be used because the link directly between the source and the destination nodes is better than linking via the relay node.

Thus, as described above with reference to FIG. 2, steps 211-215 are repeated for each of the seven cases listed in TABLE 1.

Individual Average Power Constraint

In a further exemplary embodiment, each node has an individual average power constraint $P_i$, regardless of the time duration allocated to each stage. In that case, the above-described resource allocation method can be adapted so that $\rho = P_s + P_r$ and $$\beta = \frac{P_s}{P_s + P_r}.$$

The achievable rate is then given by:

$$R = \max_{\alpha} \min\{I_1, I_2\} \quad (11)$$

$$I_1 \approx E_H\left[\alpha\log\det\left(I + \frac{P_s}{\alpha s_1}\gamma_{sr}\mu_{sr}\Lambda_{sr,s_1}\right)\right]$$

$$I_2 \approx E_H\begin{bmatrix}\alpha\log\det\left(I + \frac{P_s}{\alpha s_1}\gamma_{sd}\Lambda_{sd,s_3}\right) + \\ (1-\alpha)\log\det\left(I + \frac{P_r}{(1-\alpha)s_2}\gamma_{rd}\mu_{rd}\Lambda_{rd,s_2}\right)\end{bmatrix}.$$

Figure 3:
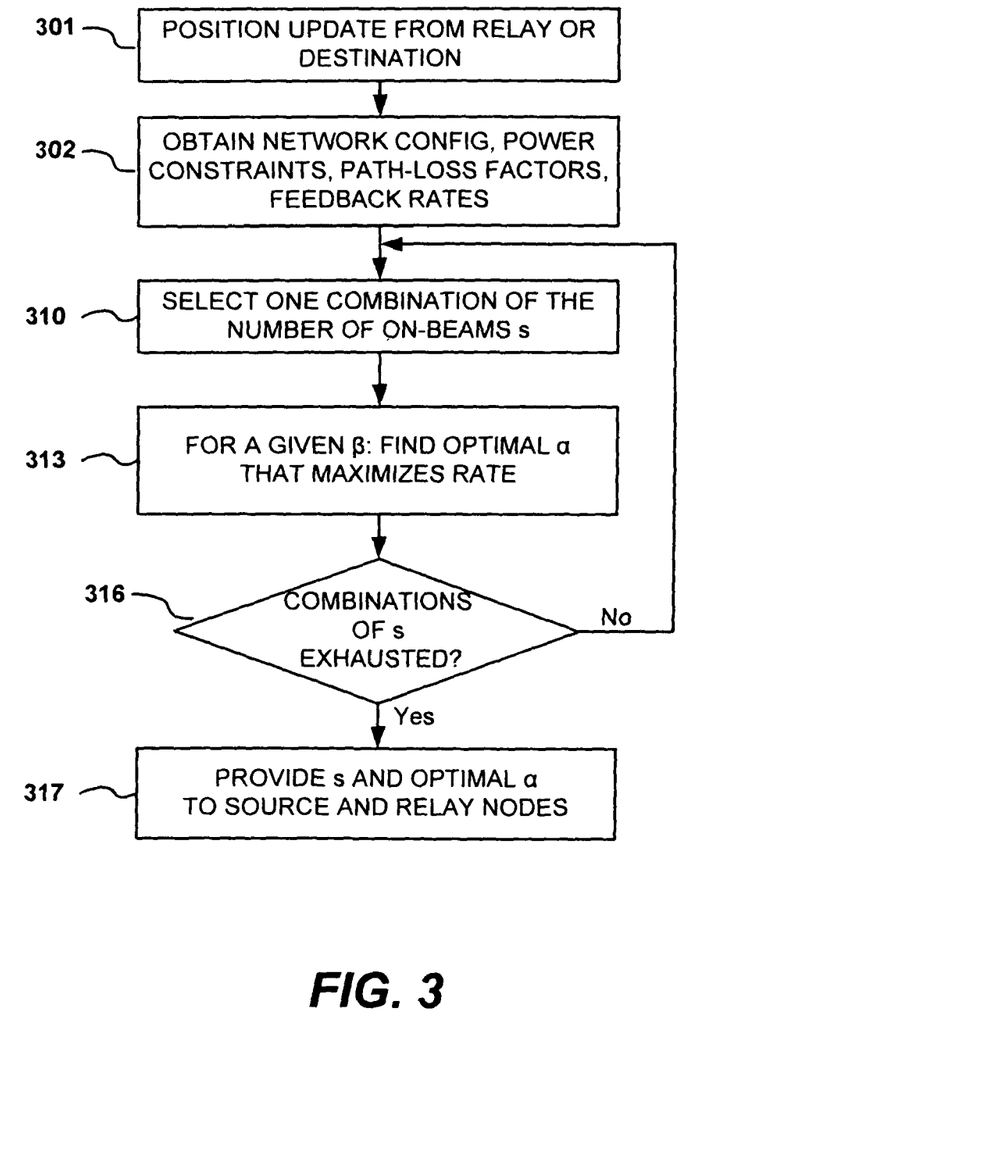
FIG. 3 is a flowchart of a further exemplary method of allocating resources for a half-duplex orthogonal decode-and-forward MIMO relay arrangement in which the source and relay nodes are subject to individual power constraints.

FIG. 3 is a flowchart of an exemplary resource allocation method for applications in which the value of $\beta$ is fixed in accordance with the aforementioned power constraint. Steps 301, 302 and 310 are similar to steps 201, 202 and 210 described above with respect to the method of FIG. 2. At step 313, for one of the possible combinations of values for s selected in 310, the optimal value for $\alpha$ is determined using a procedure similar to that described above with respect to step 212 for a given value of $\beta$.

At step 316, a determination is made as to whether all the combinations of values for s have been exhausted. If not, operation loops back to step 310 to choose another combination of values for s. If all combinations of values for s have been exhausted, operation proceeds to step 317 in which the resultant values for s and α are provided to source node S and relay node R for implementation.

Constant Peak Power Constraint

In yet a further exemplary embodiment, the source and the relay nodes are subject to a constant peak power constraint, regardless of the time duration allocated to each stage. The achievable rate is given by:

$$R = \max_{\alpha} \min\{I_1, I_2\} \quad (12)$$

$$I_1 \approx E_H\left[\alpha \log\det\left(I + \frac{P_s}{s_1}\gamma_{sr}\mu_{sr}\Lambda_{sr,s_1}\right)\right]$$

$$I_2 \approx E_H\left[\begin{array}{c} \alpha\log\det\left(I + \frac{P_s}{s_1}\gamma_{sd}\Lambda_{sd,s_3}\right) + \\ (1-\alpha)\log\det\left(I + \frac{P_r}{s_2}\gamma_{rd}\mu_{rd}\Lambda_{rd,s_2}\right) \end{array}\right].$$

By solving the equation $I_1 = I_2$, the optimal value for α is obtained as:

$$\alpha^* = \frac{M_3}{M_1 - M_2 + M_3}, \quad (13)$$

where:

$$M_1 = m_{sr}\int_{k_{sr}}^{\lambda_{sr}^+} \ln\left(1 + \frac{P_s\gamma_{sr}\mu_{sr}m_{sr}}{s_1}\right)f_{sr}(\lambda)d\lambda,$$

$$M_2 = s_3 \int_{\lambda_{sd}^-}^{\lambda_{sd}^+} \ln\left(1 + \frac{P_s\gamma_{sd}s_3}{s_1}\lambda\right)f_{sd}(\lambda)d\lambda,$$

$$M_3 = m_{rd}\int_{k_{rd}}^{\lambda_{rd}^+} \ln\left(1 + \frac{P_s\gamma_{rd}\mu_{rd}m_{rd}}{s_2}\lambda\right)f_{rd}(\lambda)d\lambda$$

$$f_{ij}(\lambda) = \frac{1}{2\pi\lambda}\sqrt{(\lambda_{ij}^+ - \lambda)(\lambda - \lambda_{ij}^-)},$$

$$m_{ij} = \min(L_{T_i}, L_{R_j}), n_{ij} = \max(L_{T_i}, L_{R_i}), \tau_{ij} = \frac{m_{ij}}{n_{ij}},$$

$$\lambda_{ij}^{\pm} = \left(\sqrt{\tau_{ij}} \pm 1\right)^2,$$

$k_{sr}$ is the solution of $$s_1 = m_{sr}\int_{k_{sr}}^{\lambda_{sr}^+} f_{sr}(\lambda)d\lambda,$$

and $k_{rd}$ is the solution of $$s_3 = m_{rd}\int_{k_{rd}}^{\lambda_{rd}^+} f_{rd}(\lambda)d\lambda.$$

With the value of β thus fixed in accordance with the constant peak power constraint, the optimal value for α can be obtained in accordance with Eq. 12. A method similar to that described above with reference to FIG. 3 can be carried out to perform resource allocation.

It should be noted that if two of the three parameters are held constant, the other can be adjusted to obtain the highest transmission rate. For example, if α and s are held constant, the optimal value of β can be obtained by following steps shown in FIG. 3 with step 316 skipped or eliminated. If β and s are held constant, the optimal value of α can be obtained by switching the roles of α and β in FIG. 3 with step 316 skipped or eliminated. If α and β are held constant, the optimal value of s can be obtained by following steps shown in FIG. 3, in which step 302 initializes the maximum bit rate to zero and step 313 is replaced by a step of computing the transmission rate with the given α and β and if the computed transmission rate is higher than the stored transmission rate replaces the stored transmission rate with the computed transmission rate. It should be noted that with these configurations, the optimal values thus obtained must be provided to nodes at step 317.

In view of the above, the foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied in one, or more, integrated circuits (ICs). Similarly, although shown as separate elements, some or all of the elements may be implemented in a stored-program-controlled processor, e.g., a digital signal processor or a general purpose processor, which executes associated software, e.g., corresponding to one, or more, steps, which software may be embodied in any of a variety of suitable storage media. Further, the principles of the invention are applicable to various types of wireless communications systems, e.g., terrestrial broadcast, satellite, Wireless-Fidelity (Wi-Fi), cellular, etc. Indeed, the inventive concept is also applicable to stationary or mobile transmitters and receivers. It is therefore to be understood that numerous modifications may be made to the illustrative embodiments and that other arrangements may be devised without departing from the spirit and scope of the present invention.

The invention claimed is:

1. In a network including a source node, a relay node, and a destination node, wherein the destination node receives signals transmitted by the source and relay nodes using power on/off beamforming with finite rate feedback of channel state information, one of the source and relay nodes is transmitting at a time, the source node is allocated a portion a of transmitting time and the relay node is allocated a portion 1−α of transmitting time, a method performed by a scheduler of allocating resources to maximize a transmission rate received by the destination node comprising the steps of:

a) receiving first partial channel state information characteristic of a first channel between the source node and the relay node, second partial channel state information characteristic of a second channel between the relay node and the destination node, and third partial channel state information characteristic of a third channel between the source node and the destination node;

b) determining a value α* of α that maximizes the transmission rate received by the destination node according to the first, second and third partial channel state information; and c) allocating a portion α* of transmitting time to the source node and a portion 1−α* of transmitting time to the relay node.

2. The method of claim 1, wherein the source and relay nodes are subject to at least one of a total power constraint, an individual average power constraint, and a constant peak power constraint.

3. The method of claim 1, wherein each of the first, second and third partial channel state information includes:
   path loss information; and
   channel statistical information.

4. The method of claim 1, wherein determining the value $\alpha^*$ includes:
   determining an intermediate value of $\alpha$ for each of a plurality of combinations of signal-to-noise ratio conditions for the first, second and third channels; and
   selecting one of the plurality of intermediate values of $\alpha$ that maximizes the transmission rate.

5. In a network including a source node, a relay node, and a destination node, wherein the destination node receives signals transmitted by the source and relay nodes using power on/off beamforming with finite rate feedback of channel state information, one of the source and relay nodes is transmitting at a time, the source node is allocated a portion $\beta$ of transmitting power and the relay node is allocated a portion $1-\beta$ of transmitting power, a method performed by a scheduler of allocating resources to maximize a transmission rate received by the destination node comprising the steps of:
   a) receiving first partial channel state information characteristic of a first channel between the source node and the relay node, second partial channel state information characteristic of a second channel between the relay node and the destination node, and third partial channel state information characteristic of a third channel between the source node and the destination node;
   b) determining a value $\beta^*$ of $\beta$ that maximizes the transmission rate received by the destination node according to the first, second and third partial channel state information; and
   c) allocating a portion $\beta^*$ of transmitting power to the source node and a portion $1-\beta^*$ of transmitting power to the relay node.

6. The method of claim 5, wherein the source and relay nodes are subject to a total power constraint.

7. The method of claim 5, wherein each of the first, second and third partial channel state information includes:
   path loss information; and
   channel statistical information.

8. The method of claim 5, wherein determining the value $\beta^*$ includes:
   determining an intermediate value of $\beta$ for each of a plurality of combinations of signal-to-noise ratio conditions for the first, second and third channels; and
   selecting one of the plurality of intermediate values of $\beta$ that maximizes the transmission rate.

9. In a network including a source node, a relay node, and a destination node, wherein the destination node receives signals transmitted by the source and relay nodes using power on/off beamforming with finite rate feedback of channel state information, one of the source and relay nodes is transmitting at a time, the source node having m on beams available and the relay node having n on beams available, a method performed by a scheduler of selecting u on beams to be used at the source node and v on beams to be used at the relay node to maximize a transmission rate received by the destination node comprising the steps of:
   a) receiving first partial channel state information characteristic of a first channel between the source node and the relay node, second partial channel state information characteristic of a second channel between the relay node and the destination node, and third partial channel state information characteristic of a third channel between the source node and the destination node;
   b) determining values of u and v that maximize the transmission rate received by the destination node according to first, second and third partial channel state information, wherein u is not greater than m and v is not greater than n; and
   c) using u on beams at the source node and v on beams at the relay node to transmit.

10. The method of claim 9, wherein the source and relay nodes are subject to at least one of a total power constraint, an individual average power constraint, and a constant peak power constraint.

11. The method of claim 9, wherein each of the first, second and third partial channel state information includes:
    path loss information; and
    channel statistical information.

12. In a network including a source node, a relay node, and a destination node, wherein the destination node receives signals transmitted by the source and relay nodes using power on/off beamforming with finite rate feedback of channel state information, one of the source and relay nodes is transmitting at a time, the source node is allocated a portion $\alpha$ of transmitting time and a portion y of transmitting power, and the relay node is allocated a portion $1-\alpha$ of transmitting time and a portion $1-\beta$ of transmitting power, a method performed by a scheduler of allocating resources to maximize a transmission rate received by the destination node comprising the steps of:
    a) receiving first partial channel state information characteristic of a first channel between the source node and the relay node, second partial channel state information characteristic of a second channel between the relay node and the destination node, and third partial channel state information characteristic of a third channel between the source node and the destination node;
    b) determining a value $\alpha^*$ of $\alpha$ and a value $\beta^*$ of $\beta$ that maximize the transmission rate received by the destination node according to the first, second and third partial channel state information; and
    c) allocating a portion $\alpha^*$ of transmitting time and a portion $\beta^*$ of transmitting power to the source node and a portion $1-\alpha^*$ of transmitting time and a portion $1-\beta^*$ of transmitting power to the relay node.

13. The method of claim 12, wherein the source and relay nodes are subject to at least one of a total power constraint, an individual average power constraint, and a constant peak power constraint.

14. The method of claim 12, wherein each of the first, second and third partial channel state information includes:
    path loss information; and
    channel statistical information.

15. The method of claim 12, wherein determining the values $\alpha^*$ and $\beta^*$ includes:
    determining a pair of intermediate values of $\alpha$ and $\beta$ for each of a plurality of combinations of signal-to-noise ratio conditions for the first, second and third channels; and
    selecting one of the plurality of pairs of intermediate values of $\alpha$ and $\beta$ that maximizes the transmission rate.

16. The method of claim 12, wherein the source node has m on beams available and the relay node has n on beams available, u on beams to be used in the source node and v on beams to be used in the relay node, the method further comprising:
    d) determining values of u and v that maximize the transmission rate received by the destination node according to the first, second and third partial channel state information, wherein u is not greater than m and v is not greater than n; and
    e) using u on beams at the source node and v on beams at the relay node to transmit.

* * * * *